UNITED STATES PATENT OFFICE.

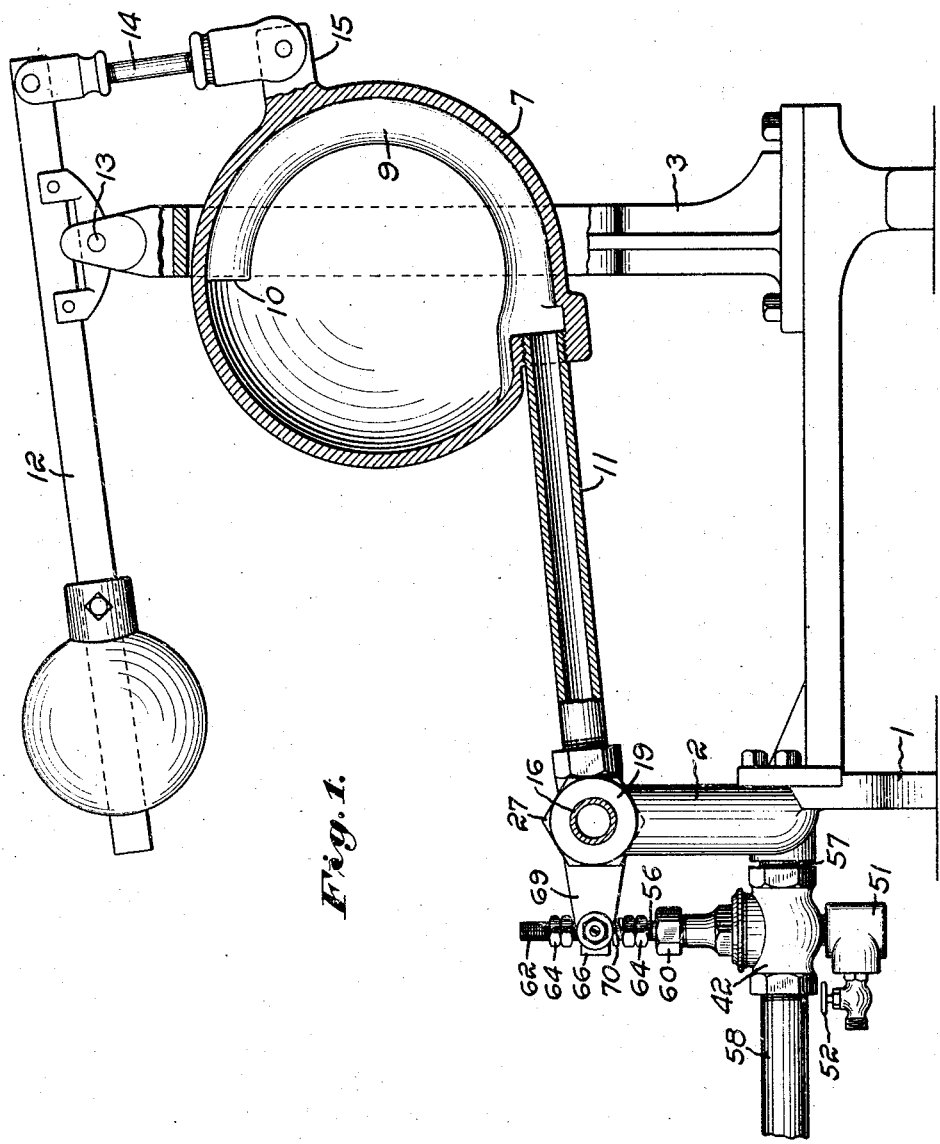

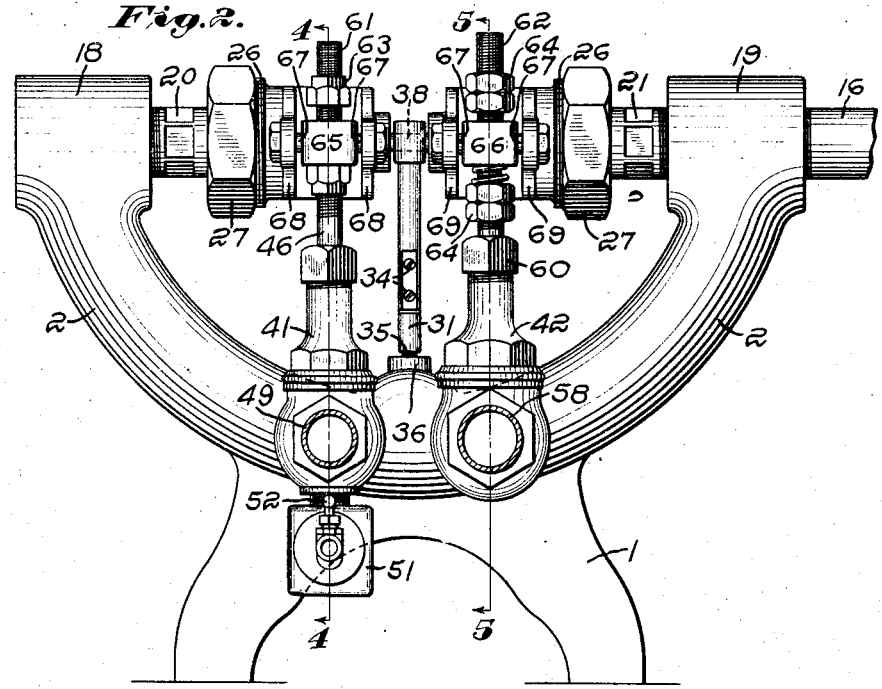
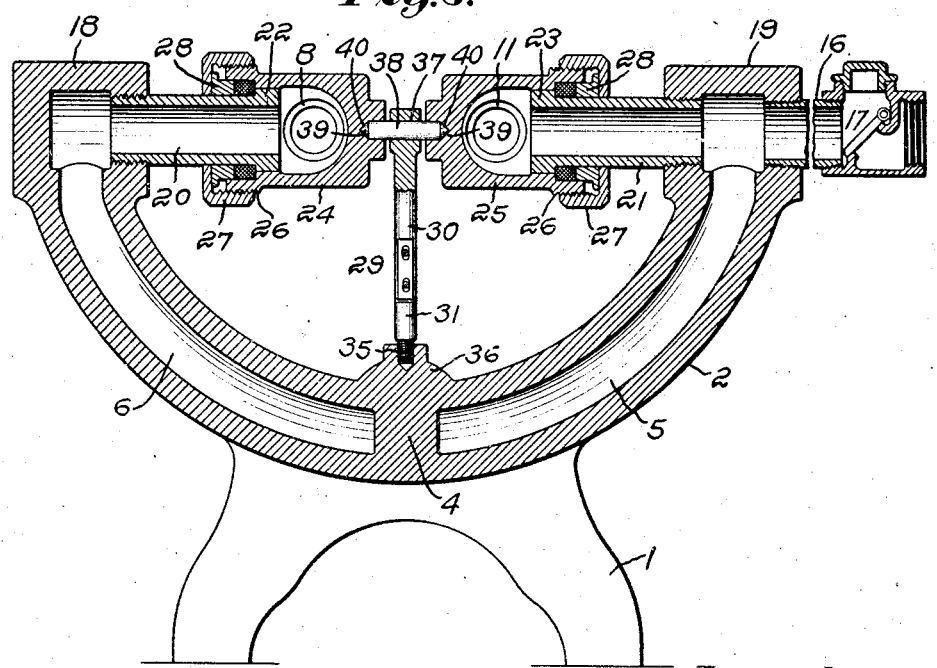

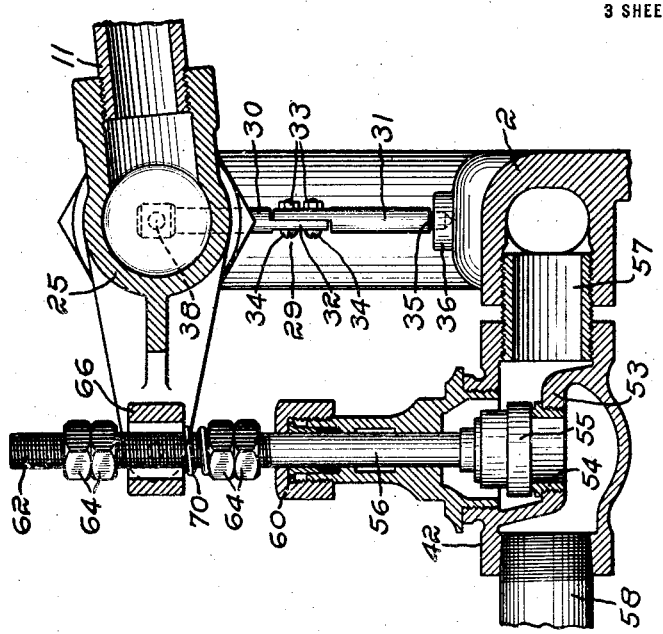

JOHN SABIN, OF NASHUA, NEW HAMPSHIRE, ASSIGNOR TO NASHUA MACHINE COMPANY, OF NASHUA, NEW HAMPSHIRE, A CORPORATION OF MAINE.

STEAM-TRAP AND VALVE MECHANISM THEREFOR.

1,259,909.        Specification of Letters Patent.        Patented Mar. 19, 1918.

Application filed August 23, 1917. Serial No. 187,874.

*To all whom it may concern:*

Be it known that I, JOHN SABIN, a citizen of the United States, and a resident of Nashua, in the county of Hillsborough and State of New Hampshire, have invented an Improvement in Steam-Traps and Valve Mechanism Therefor, of which the following description, in connection with the accompanying drawings, is a specification, like characters on the drawings representing like parts.

This invention particularly relates to steam traps and valve mechanism therefor. In order that the principle of the invention may readily be understood, I have disclosed a single embodiment thereof in the accompanying drawings wherein:

Figure 1 is a view partially in side elevation and partially in vertical section of a steam trap embodying my invention and to which the valve mechanism of my invention may be applied;

Fig. 2 is a view mainly in front elevation but partially in vertical transverse section of the steam trap support and co-acting parts;

Fig. 3 is a vertical transverse sectional view of the construction shown in Fig. 2;

Fig. 4 is a vertical longitudinal section upon the line 4—4 of Fig. 2; and

Fig. 5 is a similar view upon the line 5—5 of Fig. 2.

Referring more particularly to the drawings, the illustrative steam trap preferably comprises a frame including a tripod or base 1 for supporting the various parts of the trap including a support or yoke 2, preferably though not necessarily of substantially semi-ring-like form, and a ring 3 rising from the tripod at or near the end thereof opposite the yoke or support 2. Preferably the support or yoke is hollow and preferably at or near the bottom thereof it is provided with a transverse partition 4, thus providing at one side thereof a water passage 5 and at the opposite side thereof a steam passage 6.

The trap is provided with a suitable receiver preferably partaking of the form of a bowl such as represented at 7 in the several figures of the drawing and herein shown as spherical. The said bowl is provided with a plurality of substantially parallel pipes, one of which is indicated at 8 in Fig. 3 as in communication with the steam passage 9, preferably cast upon the inner surface of the bowl and having an outlet 10 communicating with the interior of the bowl at the top thereof. The water inlet and outlet pipe is indicated at 11 in Fig. 1 and is in communication with the bowl at the base thereof.

The tilting of the bowl 7 is governed in any suitable manner and preferably by means of a weighted lever 12 pivoted at 13 upon the ring 3 and connected by a link 14 with an ear 15 on the said bowl. If desired, I may provide a leverage-changing device, such as an elongated bearing, for the lever 12 of the general character shown in the co-pending application of Frank A. Littlefield, Serial No. 35,260. It is, however, obvious that any suitable means may be provided to coöperate with the bowl in effecting the proper tilting or movement thereof.

The water inlet of the main water inlet pipe is indicated at 16 in Figs. 2 and 3 and leads from the boiler or other suitable source and preferably is provided with a check or other suitable valve preventing return of the water through the said pipe 16 and compelling the water discharged from the trap to travel through the passage 5 of the yoke or support, as hereinafter more fully described.

The two arms of the yoke or support 2 preferably terminate in enlargements 18, 19, into which preferably are tapped or otherwise secured two pipes 20, 21, herein shown as having flanges 22, 23, at the inner ends thereof. Upon said pipes 20, 21 are mounted for turning movement two elbows 24, 25 into which are tapped or otherwise secured the two pipes 8 and 11 for conducting steam to the trap and for supplying water of condensation thereto and for withdrawing it therefrom.

Any suitable form of coupling may be supplied between the pipes 20, 21, respectively, and the elbows 24, 25, as, for example, that form of coupling shown in the patent to Frank A. Littlefield, No. 1,164,537, dated December 14, 1915. Herein I have shown each of said elbows 24, 25, as externally threaded at 26 to receive a gland 27 and securing in position suitable packing members 28 the construction of which need not herein be more fully described.

It is of great importance that the elbows 24, 25, or equivalent parts be held in proper position with relation to each other and also with relation to the respective pipes 20, 21, since otherwise in the rocking movement of the trap and particularly when the rocking movement is employed to operate the valves, the packing herein indicated at 28 binds upon or with relation to the pipes or couplings so as to render the operation of the trap unsatisfactory. For example, upon the downward movement of the trap there is a tendency of the packing rings 28 to bind at the top portion upon the pipes 20, 21, and upon the upward movement of the trap there is a tendency to bind at the lower portion of said rings. To overcome this and other objections I have provided means preferably extending from the yoke 2 and coöperating with the elbows 24, 25, to preserve the proper alinement and position of the parts. While any suitable means may be provided for the purpose, I have herein represented a post herein generally indicated at 29 in Figs. 3 and 5. For the purpose the said post is here shown as consisting of the upper and lower members 30, 31, each cylindrical in form but having end portions 32, 33, of reduced diameter, squared or flattened, and provided with openings for the reception of bolts 34, one of said end portions, as for example the end portion 32, having the openings somewhat elongated so as to permit the vertical adjustment of the post. The post member 31 is secured in any way to the trap 2 and preferably by being tapped at 35 into a boss or enlargement 36 thereon.

The upper end of the post 29 may be operatively connected in any suitable manner with the elbows 24, 25, but preferably in such a manner as to permit rocking movement of said elbows. Inasmuch as the parts are assembled by springing the elbows 24, 25, sufficiently apart to permit them to receive and engage the post 29, I preferably form an opening 37 extending transversely through the upper part of the post and therein slidably mount a pin 38 herein shown as having pointed ends 39 received in similarly shaped sockets 40, thus permitting ready rocking movement of said elbows 24, 25, and permitting self adjustment of said pin 38 with respect to the elbows 24, 25, when the latter are released after being sprung apart. I provide an automatic adjustment of the pivotal relation or engagement between the post and the pipes extending from the bowl. In this form of my invention, such automatic adjustment is effected by the slidable pin 38.

Preferably the post 29 is in the vertical plane of the longitudinal axis of the bowl. This effects an even distribution of the strain upon the two packings 28, 28. Thus, the said post 29 is symmetrical with respect to the bowl and the pipes extending therefrom.

In order to control the flow of fluid to and from the bowl 7, I provide suitable valve mechanism and for that purpose I preferably provide two valve casings or fittings which are wholly distinct and separate, the one from the other, and which are in communication with the yoke or support 2 at opposite sides of the partition 4 therein. For that purpose I have herein shown two valve casings or fittings 41, 42, the former of which preferably controls the steam inlet and the vent from the trap, and the latter of which preferably controls the water outlet, it being evident that the water inlet is controlled by the flap valve 17.

While for the purpose the structure of the valves may be varied, I have herein shown the valve casing or fitting 41 as having therein a partition 43 receiving a valve seat 44 with which coöperates a valve disk 45 upon a valve stem 46 having at its lower end a valve member 47 controlling the vent passage 48. The valve disk 45 controls the inflow of steam which, as indicated most clearly in Fig. 4, is admitted through the pipe 49 from any suitable source of supply and entering past the valve 45, when raised, is admitted into a short piping or coupling 50 which is in communication with the steam passage 6 in the yoke at the left hand side, viewing Fig. 3 of the partition 4. If desired, the valve fitting 41 may have secured to the lower portion thereof a member 51 through which the trap is vented and which may be provided with a manually operable valve 52 as indicated in Fig. 1. The valve fitting 42 is provided with a partition 53 having therein a seat 54 receiving a valve disk 55 mounted upon a valve stem 56. The valve 55 controls the water discharge and to that end the water passage 5 of the yoke 2 is connected by a pipe 57 with said valve casing or fitting 42, and leading from said valve casing or fitting is a water discharge pipe 58.

The valve stems 46 and 56 are preferably of similar or like construction and extend through suitable glands and packings 59, 60, are shown as threaded at 61, 62, and are provided with suitable nuts 63, 64, between which are respectively received cylindrical members 65, 66, having laterally extending pivotal lugs 67 pivotally mounted in the pairs of spaced webs or members 68, 68, 69, 69 respectively extending from the elbows 24, 25.

The construction and operation of the parts is such that upon the downward rocking movement of the bowl 7, when the same has been filled with water of condensation, the steam valve 45 is lifted, thus permitting the flow of steam into the bowl 7; and the valve 55 is lifted, thus permitting the discharge of the water of condensation from the trap through steam pressure into the pipe 58. The return movement of the bowl closes the valve 45 and opens the vent valve 47, and also closes the valve 55, thus preventing further escape of water of condensation and compelling the entering water of condensation from the boiler to flow directly through the pipe 21 into the bowl pipe 11 as indicated most clearly in Fig. 3. Preferably but not necessarily I provide a coil or other spring 70 between the cylindrical member 66 and the lower nuts 64, so as to permit slight yielding movement and whereby, if desired, the water outlet valve may open very slightly before the opening of the steam admission valve.

The provision of the wholly distinct valve casings or fittings 41, 42, constitutes an important feature of my invention and particularly do I employ such construction when employing a positioning or supporting means, one form of which is typified by the adjustable supporting post 29. Furthermore, by providing the distinct and separate valve fittings, access to all the valves is rendered easy.

Having thus described one form of my invention, I desire it to be understood that although I have employed specific terms, they are used in a generic or descriptive sense and not for purpose of limitation, the scope of the invention being set forth in the following claims:—

1. A steam trap comprising, in combination, a support having two hollow arms, a receiver having two parts that are respectively in communication with said arms, means extending from said support between said parts and having supporting relation with each of said parts, valve casings or fittings distinct from each other and below the place of said supporting relation, a valve in each of said casings and operatively connected to the said parts respectively, thereby to be moved by and upon movement of the said receiver.

2. A steam trap comprising, in combination, a support having two hollow arms, a receiver or bowl having two pipes respectively in communication with said arms, means extending from said support between the said pipes and having supporting relation with each of said pipes, said pipes being sprung into said supporting relation, valve casings or fittings distinct from each other, and a valve in each of said casings or fittings and operatively connected to the said pipes respectively, thereby to be moved upon movement of the receiver or bowl.

3. A steam trap comprising, in combination, a yoke having two upright arms, a bowl or receiver having two substantially parallel pipes respectively in rocking communication with the said arms, means upwardly extending from said yoke between said pipes and having rocking relation with said pipes, valve casings or fittings distinct from each other and in communication with the said yoke at opposite sides of said upwardly extending means and a valve in each casing and operatively connected to said parts respectively, thereby to be moved by and upon movement of the said bowl or receiver.

4. A steam trap having, in combination, a yoke provided with two hollow arms, a bowl having two substantially parallel pipes respectively in rocking communication with said arms, a supporting post upwardly extending from said yoke between said pipes and having rocking relation with said pipes, two valve casings or fittings distinct from each other and oppositely arranged with respect to said post and respectively communicating with said yoke and a valve in each casing and operatively connected to said pipes and respectively directly controlling the steam inlet and water outlet, thereby to be moved by and upon movement of the bowl.

5. A steam trap having, in combination, a yoke having two hollow arms, a transverse partition separating the passages of said arms, a bowl having pipes respectively in rocking communication with said arms and two valve casings or fittings distinct from each other and respectively in communication with the lower portion of the yoke at opposite sides of said partition and a valve in each of said casings and operatively connected to said trap pipes, thereby to be moved by and upon movement of the said trap.

6. A steam trap comprising, in combination, a yoke having two arms respectively provided with a steam passage and a water passage, a transverse partition separating said passages, a bowl having two substantially parallel pipes respectively in communication with said arms, two valve casings or fittings distinct from each other, one for controlling the flow of steam through one of said passages and the other for controlling the flow of water through the other of said passages, a valve in each of said casings and means operatively connecting said valves with the trap, thereby to operate said valves upon movement of the trap.

7. A steam trap comprising in combination, a support having two hollow arms, a receiver having two parts that are respectively in communication with said arms, valve casings or fittings distinct from each other but both communicating with the lower part of said support, and a valve in each of said casings and operatively connected to said parts respectively, thereby to be moved by and upon the movement of said receiver.

8. A steam trap comprising in combination, a yoke having two hollow arms, a receiver having two parts that are respectively in communication with said two arms, valve casings or fittings distinct from each other but both communicating with the lower part of said yoke, and a valve in each of said casings and operatively connected to said parts respectively, thereby to be moved by and upon the movement of said receiver, one of said valves controlling the flow of steam and the other controlling the flow of water.

9. A steam trap comprising in combination, a yoke having two upwardly extending hollow arms, a bowl having two pipes that are respectively in communication with said arms, valve casings or fittings distinct from each other but positioned side by side and communicating directly with the lower part of said yoke, and a valve in each of said casings and operatively connected to the said pipes respectively, thereby to be moved by and upon movement of said bowl.

10. A steam trap comprising in combination a yoke having two upwardly extending hollow arms, a bowl having two pipes that are respectively in communication with said arms, valve casings or fittings distinct from each other but positioned side by side and communicating directly with the lower part of said yoke and steam controlling and water controlling valves respectively mounted in said casings or fittings and operatively connected to said pipes respectively, thereby to be moved upon movement of said bowl.

11. A steam trap comprising in combination a yoke having two upwardly extending hollow arms, a bowl having two pipes that are respectively in communication with said arms, valve casings or fittings distinct from each other but positioned side by side and communicating directly with the lower part of said yoke, a steam inlet valve and a vent valve in one of said casings, and a water outlet valve in the other of said casings, said valves being operatively connected to said pipes, thereby to be moved by and upon movement of the bowl.

12. A steam trap comprising in combination, a yoke having two upwardly extending hollow arms, a bowl having two pipes that are respectively in communication with said arms, a post extending upwardly from said yoke between said pipes and having pivotal, automatically adjusted engagement with the pipes extending from said bowl.

13. A steam trap comprising in combination, a yoke having two upwardly extending hollow arms, a partition between said arms, a bowl having two pipes that are respectively in communication with said arms, a post extending upwardly from said yoke and having pivotal engagement with the pipes extending from said bowl, valve casings or fittings distinct from each other at opposite sides of said partition, and a valve in each of said casings and operatively connected to said pipes, thereby to be moved by and upon rocking movement of said bowl.

14. A steam trap comprising in combination, a support having a yoke provided with two upwardly extending, hollow arms, a bowl having two pipes that are respectively in communication with said arms and that are adapted to be sprung apart in assembling the trap, a post upwardly extending from said yoke and adapted to enter between said sprung apart pipes and pivotally to engage them.

15. A steam trap comprising in combination, a support having a yoke provided with two upwardly extending, hollow arms, a bowl having two pipes that are respectively in communication with said arms and that are adapted to be sprung apart in assembling the trap, a post upwardly extending from said yoke and adapted to enter between said sprung apart pipes and pivotally to engage them, two valve casings or fittings distinct from each other but communicating with the lower part of said yoke, and a valve in each of said casings when operatively connected to said pipes respectively, thereby to be moved by and upon movement of said receiver.

16. A steam trap comprising in combination, a yoke having two upwardly extending arms, a bowl having two pipes that are respectively in communication with said arms and that are adapted to be sprung apart in assembling the trap, a post extending upward from the yoke and having a transversely movable part adapted to enter between said sprung apart pipes and pivotally to engage the same upon release, two valve casings or fittings distinct from each other and directly in communication with the lower part of said yoke.

17. A steam trap comprising in combination, a yoke having two upwardly extending arms, a bowl having two pipes that are respectively in communication with said arms and that are adapted to be sprung apart in assembling the trap, a post extending upward from the yoke and having a transversely movable part adapted to enter between said sprung apart pipes and pivotally to engage the same upon release, two valve casings or fittings distinct from each other and directly in communication with the lower part of said yoke, and a valve in each of said casings and respectively controlling the steam and the water flow.

18. A steam trap comprising in combination, a yoke having two upwardly extending arms, a bowl having two pipes respectively in communication with said arms, a vertically adjustable post upwardly extending from said yoke and having pivotal engagement with said pipes, two valve casings distinct from each other and each directly communicating with said yoke near the bottom thereof, and a valve in each of said casings and controlling the steam inlet and water outlet respectively.

19. A steam trap comprising in combination, a yoke having two upwardly extending hollow arms, a bowl having two pipes extending therefrom, elbows upon said pipes having rocking engagement with the arms of said yoke, two valve casings or fittings distinct from each other, arranged side by side and directly communicating with the lower part of said yoke, a valve in each of said casings, one of said valves controlling the flow of steam and the other controlling the outflow of water, and means operatively connecting said valves and said elbows.

20. A steam trap comprising in combination, a yoke 2, a bowl 7 having a steam inlet pipe 8 and a water inlet and outlet pipe 11 operatively connecting said yoke and bowl, two valve casings or fittings 41, 42 directly communicating with the lower part of said yoke, valves 45, 47 in said valve casing 41, and a valve 55 in said valve casing 42.

21. A steam trap comprising in combination, a support having a yoke provided with two upwardly extending, hollow arms, a bowl having two pipes that are respectively in communication with said arms, and a post upwardly extending from said yoke and adapted to enter between said pipes and pivotally to engage therewith and having provisions effecting automatic adjustment of said pivotal engagement.

22. A steam trap comprising in combination, a support having two upwardly extending hollow arms, a receiver having two parts that are respectively in communication with said arms, means extending from said support between said parts and having supporting relation with each of said parts, a plurality of valve casings or fittings distinct from each other and communicating with said support at its lower part between said arms, and a valve in each of said casings and operatively connected to said parts respectively, thereby to be moved by and upon movement of said receiver.

23. A steam trap comprising in combination, a yoke having two upwardly extending hollow arms, thereby forming a semi-ring, a receiver having two parts that are respectively in communication with said arms, means extending from said yoke between said parts and having supporting relation with each of said parts, valve casings or fittings distinct from each other and communicating with said yoke at its lower part, and a valve in each of said casings and operatively connected to said parts respectively, thereby to be moved by and upon movement of said receiver.

24. A steam trap comprising in combination, a yoke having two upwardly extending hollow arms, a receiver having two parts that are respectively in communication with said arms, means extending from said support between said parts and having supporting relation with each of said parts, valve casings or fittings arranged side by side and communicating with the lower part of said yoke, a valve in each of said casings, the valve stems thereof being arranged side by side and operatively connected to the parts respectively, thereby to be moved by and upon movement of said receiver.

25. A steam trap comprising in combination, a yoke in the form of a semi-ring having two upwardly extending arms, a receiver having two parts that are respectively in communication with said arms, means extending from said support between said parts and having supporting relation with each of said parts, two valve casings or fittings distinct from each other arranged side by side and communicating with the lower part of said yoke, and a valve in each of said casings and having valve stems which are arranged side by side and are operatively connected to the said parts respectively, thereby to be moved by and upon movement of the said receiver.

26. A steam trap comprising in combination, a yoke in the form of a semi-ring having two upwardly extending hollow arms, a tilting bowl having two pipes that are respectively in communication with said arms, two valve casings or fittings distinct from each other arranged side by side and communicating with the lower part of said yoke, and a valve in each of said casings, said valves having valve stems that are arranged side by side and are operatively connected to the said pipes of said bowl, thereby to be moved by and upon movement of the said bowl.

27. A steam trap comprising in combination, a yoke in the form of a semi-ring having two upwardly extending hollow arms, a tilting bowl having two pipes that are respectively in communication with the said arms, two valve casings or fittings distinct from each other arranged side by side and respectively communicating with the lower part of the said yoke at opposite sides of the vertical center thereof, and a valve in each of said casings provided with a valve stem, said valve stems being arranged side by side and operatively connected to the said pipes of the bowl, thereby to be moved by and upon movement of the said bowl.

28. A steam trap comprising in combination, a yoke in the form of a semi-ring having two upwardly extending hollow arms, a partition separating said arms, pipes 20, 21 inwardly extending from said hollow arms, a tilting bowl having two pipes in communication with said pipes 20, 21 respectively and provided with packed elbows adapted to turn upon said pipes 20, 21, means extending from said yoke between said pipes of the bowl and having supporting relation with each of said pipes, and two valve casings at opposite sides of said partition and each having a valve directly controlling communication with said yoke.

29. A steam trap comprising in combination, a support having two hollow arms, a receiver having two parts that are respectively in communication with said arms, means extending from said support between said parts and having supporting relation with each of said parts, valve casings or fittings distinct from each other and at opposite sides of said means, and a valve in each of said casings and operatively connected to said parts respectively, thereby to be moved by and upon movement of the said receiver.

30. A steam trap having in combination, a support provided with two hollow members, a partition separating the passages of said members, a bowl having passages respectively in rocking communication with said members and two valve casings or fittings distinct from each other and respectively in communication with the lower part of the support at opposite sides of said partition, and a valve in each of said casings and operatively connected to said trap, thereby to be moved by and upon movement of said trap.

31. A steam trap having in combination, a yoke provided with two hollow arms, a partition separating the passages of said arms, a bowl having pipes respectively in rocking communication with said arms, and two valve casings or fittings distinct from each other and respectively in communication with the yoke at opposite sides of said partition, a support between said arms and also between said valve casings or fittings, and a valve in each of said casings and operatively connected to said trap pipes, thereby to be moved by and upon movement of said trap.

32. A steam trap comprising in combination a support having two hollow parts, a bowl having two pipes that are respectively in communication with said hollow parts and that are adapted to be sprung apart in assembling the trap, a post-like member upwardly extending from said support and adapted to enter between said sprung apart pipes and pivotally to engage them.

33. A steam trap comprising in combination, a support having two upwardly extending hollow arms, a receiver having two parts that are respectively in communication with said arms and having a rocking relation with respect to said support, means extending from said support between said two parts and having pivotal relation with each of said parts, a plurality of valve casings or fittings distinct from each other and communicating with said support at its lower part between said arms, and a valve in each of said casings operatively connected to each of said parts respectively, thereby to be moved by and upon movement of said receiver.

In testimony whereof, I have signed my name to this specification.

JOHN SABIN.

Copies of this patent may be obtained for five cents each, by addressing the "Commissioner of Patents, Washington, D. C."

It is hereby certified that in Letters Patent No. 1,259,909, granted March 19, 1918, upon the application of John Sabin, of Nashua, New Hampshire, for an improvement in "Steam-Traps and Valve Mechanism Therefor," an error appears in the printed specification requiring correction as follows: Page 4, claim 8, strike out line 4 and insert the words *in communication with said arms, two valve;* and that the said Letters Patent should be read with this correction therein that the same may conform to the record of the case in the Patent Office.

Signed and sealed this 14th day of May, A. D., 1918.

[SEAL.]

R. F. WHITEHEAD,
*Acting Commissioner of Patents.*

Cl. 137—103.